US009397841B2

(12) United States Patent
Godse (10) Patent No.: US 9,397,841 B2
(45) Date of Patent: Jul. 19, 2016

(54) MOTION-BASED HUMAN VERIFICATION SYSTEM AND METHOD

(71) Applicant: YAHOO! INC., Sunnyvale, CA (US)

(72) Inventor: Gautam Godse, Monrovia, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 30 days.

(21) Appl. No.: 13/927,493

(22) Filed: Jun. 26, 2013

(65) Prior Publication Data
US 2015/0007289 A1    Jan. 1, 2015

(51) Int. Cl.
G06F 21/00    (2013.01)
H04L 9/32    (2006.01)
G06F 21/31    (2013.01)

(52) U.S. Cl.
CPC .............. *H04L 9/3271* (2013.01); *G06F 21/31* (2013.01); *G06F 2221/2133* (2013.01)

(58) Field of Classification Search
CPC combination set(s) only.
See application file for complete search history.

(56) References Cited

U.S. PATENT DOCUMENTS

| 7,721,107 | B2 * | 5/2010 | Golle et al. ................... 713/184 |
|---|---|---|---|
| 2010/0162357 | A1 * | 6/2010 | Chickering et al. ............. 726/3 |
| 2012/0183270 | A1 * | 7/2012 | Greenblatt et al. ........... 386/224 |
| 2013/0043652 | A1 * | 2/2013 | Borer ............................ 273/246 |
| 2013/0179958 | A1 * | 7/2013 | Fujiwara et al. .................. 726/7 |
| 2014/0096272 | A1 * | 4/2014 | Makofsky et al. .............. 726/34 |
| 2014/0173286 | A1 * | 6/2014 | Novak .......................... 713/176 |
| 2014/0189856 | A1 * | 7/2014 | Yoo ................................. 726/19 |
| 2014/0223547 | A1 * | 8/2014 | Tse et al. ........................ 726/19 |
| 2014/0298433 | A1 * | 10/2014 | McLaughlin et al. ............. 726/6 |

* cited by examiner

*Primary Examiner* — Jeffrey Pwu
*Assistant Examiner* — William Corum, Jr.
(74) *Attorney, Agent, or Firm* — James J. DeCarlo; Greenberg Traurig LLP (57) ABSTRACT

Disclosed herein is a human verification system, method and architecture, which make use of sensing components built into a user's computing device, or otherwise coupled to the user's device, to receive a response to a challenge-response verification test, which may comprise a pattern-based and/or an image-based challenge-response.

27 Claims, 7 Drawing Sheets

MOTION-BASED HUMAN VERIFICATION SYSTEM AND METHOD

FIELD OF THE DISCLOSURE

The present disclosure relates to human verification, and more particularly to human verification using input from a computing device's sensor(s), or sensing devices and/or components.

BACKGROUND

Human verification is a technique used by a computer system, or an application executing on a computer system, to ensure that it is interacting with a human being rather than another computer system, e.g., that the response(s) received are from a human being. To verify that a responder is a human being, the computer system may ask the responder to complete a simple test which the computer system then grades. The test used by the computer system is typically designed to be easy for the computer to generate and easy for humans to solve, but difficult for another computer system to solve. This type of test is typically referred to as a challenge-response test. An example of a conventional challenge-response test is CAPTCHA, which requires the responder to type letters and/or digits from a distorted image that appears on the screen. Another conventional challenge-response technique involves sending the user some text, e.g., a temporary pin code, via a messaging service/system, such as a short messaging or electronic mail service/system, which the user must type in for verification. Most users consider these human verification tests to be an annoyance and onerous, and consequently the conventional human verification tests may cause the user to decide not to interact with a system, website, etc. that requires human verification.

SUMMARY

The present disclosure seeks to address failings in the art and to provide human verification techniques to verify that a responder is a human using engaging challenge-response techniques. In accordance with one or more embodiments, challenge-response techniques include challenging the user to trace a pattern in three-dimensional space to match the pattern shown on the screen. In accordance with one or more embodiments, sensors built into a user's computing device may be used to verify that the user, or responder, is a human being. By way of some non-limiting examples, sensors may be used to detect motion, location, altitude, direction, orientation, geo-location, proximity, familiar objects in the vicinity, etc. Embodiments of the present disclosure may use one or more sensors internally-coupled and/or externally-coupled to the user's device, and use input received from the one or more sensors to verify that the responder is a human being. By way of a non-limiting example, a human verification testing in accordance with at least one embodiment of the present disclosure might display a pattern, or graphic object, on the screen of the user's mobile device, which pattern the user is asked to draw, or trace, in space, three-dimensional space, using the user's mobile device. One or more movement sensors may be used to register the movement of the user's device as the user traces the pattern. By way of a further non-limiting example, the user may be requested to perform take an image of an object, which object is believed to be in the vicinity of the user's device, using the user's device. Embodiments of the present disclosure determine whether or not the response satisfactorily match the challenge, and a satisfactory response may provide proof that the user is a human being to a computer system and/or application executing on the computer system.

In accordance with one or more embodiments, a method is provided, the method comprising selecting, by at least one computing system, a challenge type for a human verification test to determine whether a responder is human, the challenge type being selected from challenge types comprising a pattern-based challenge and an image-based challenge; determining, by the at least one computing system, a challenge in accordance with the selected challenge type; causing, by the at least one computing system, the challenge to be made available at a user device, the user device comprising one or more sensors; receiving, by the at least one computing device, input in response to the challenge, the input comprising input received using the one or more sensors; determining, by the at least one computing device, whether the challenge is satisfied using the received input.

In accordance with one or more embodiments a system is provided, which system comprises at least one computing device comprising one or more processors to execute and memory to store instructions to select a challenge type for a human verification test to determine whether a responder is human, the challenge type being selected from challenge types comprising a pattern-based challenge and an image-based challenge; determine a challenge in accordance with the selected challenge type; cause the challenge to be made available at a user device, the user device comprising one or more sensors, receive input in response to the challenge, the input comprising input received using the one or more sensors; and determine whether the challenge is satisfied using the received input.

In accordance with yet another aspect of the disclosure, a computer readable non-transitory storage medium is provided, the medium for tangibly storing thereon computer readable instructions that when executed cause at least one processor to select a challenge type for a human verification test to determine whether a responder is human, the challenge type being selected from challenge types comprising a pattern-based challenge and an image-based challenge; determine a challenge in accordance with the selected challenge type; cause the challenge to be made available at a user device, the user device comprising one or more sensors; receive input in response to the challenge, the input comprising input received using the one or more sensors; and determine whether the challenge is satisfied using the received input.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 3, which comprises

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

Certain embodiments of the present disclosure will now be discussed with reference to the aforementioned figures, wherein like reference numerals refer to like components.

In general, the present disclosure includes a human verification system, method and architecture, which make use of sensing components built into a user's computing device, or otherwise coupled to the user's device. By way of some non-limiting examples, the user's device may be any device capable of accepting signals from one or more sensors, which sensors may be internal to the device or otherwise coupled to the device, e.g., via a wired or wireless connection with the device. By way of some further non-limiting examples, the user's device might be any computing device including without limitation a personal data assistant, smartphone, tablet, digital still and/or video camera, laptop, etc.

Figure 1:
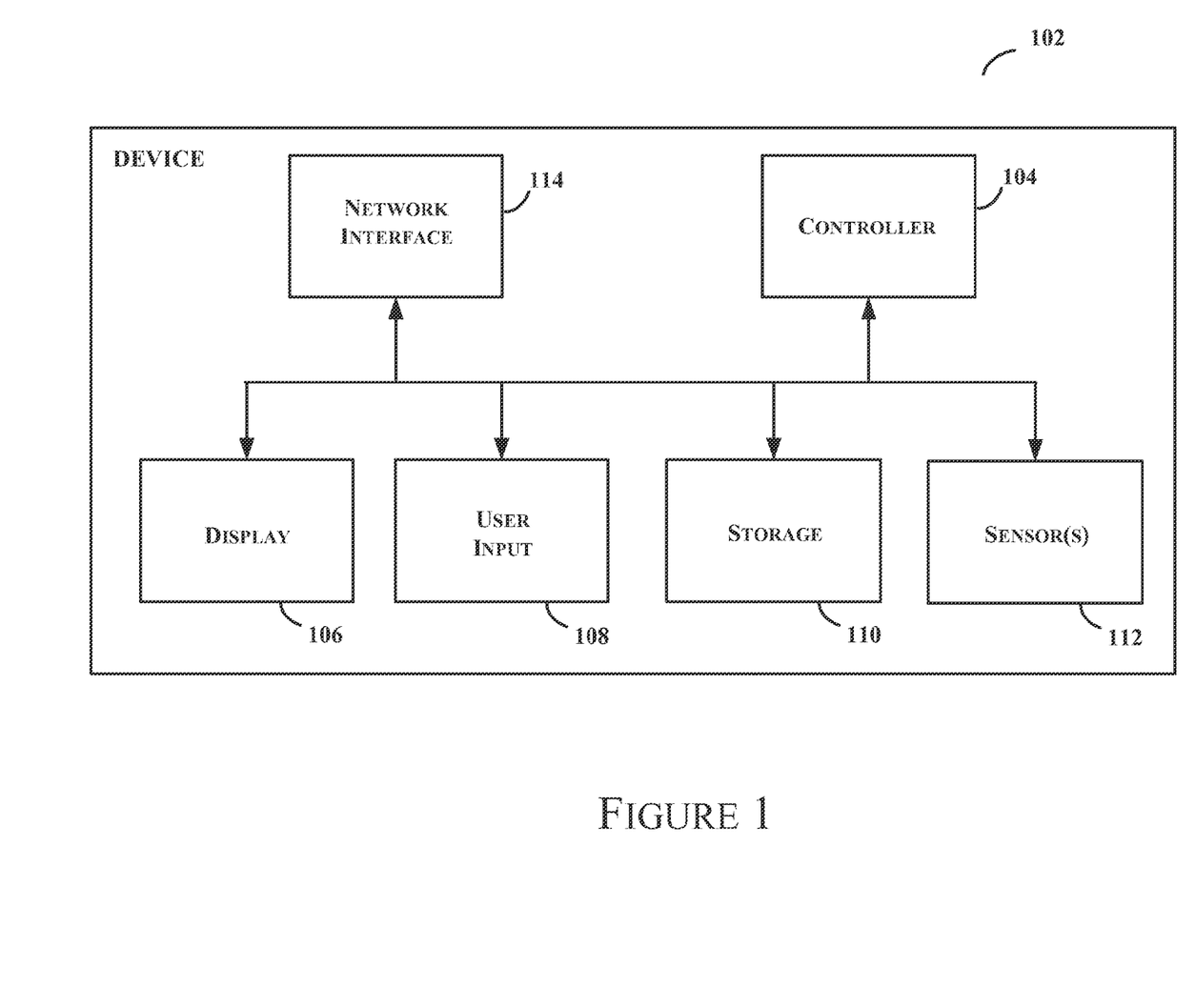
FIG. 1 provides some examples of components of a device which may be used in connection with one or more embodiments of the present disclosure.

FIG. 1 provides some examples of components of a device which may be used in connection with one or more embodiments of the present disclosure. In the example shown in FIG. 1, device 102 comprises a controller, or processing unit, 104, display 106, user input 108, storage 110, sensor(s) 112 and network interface 114. In accordance with one or more embodiments, device 102 may comprise a portable, or mobile, electronic device. In accordance with one or more embodiments, device 102 may comprise any electronic device, and may be any portable, mobile, hand-held or miniature consumer electronic device. By way of some non-limiting examples, device 102 might be a music player, video player, still image player, game player, other media player, music recorder, video recorder, camera, other media recorder, radio, medical equipment, calculator, cellular phone, other wireless communication device, personal digital assistant, programmable remote control, pager, laptop computer, printer, watch, or any combination thereof.

Sensor(s) 112 may be any one or more of the sensors described herein, and may include any sensor now known or later developed. Device 102 may have a housing within which is disposed display 106. User input 108 may comprise a component capable of receiving input from the user, such as and without limitation one or more buttons, touchpad, touchscreen display, electronics for accepting voice commands, antennas for accepting signals from other electronic devices, and the like. In accordance with one or more embodiments, display 106 and user input 108 may be integrated into one component, which component comprises a touchscreen display.

Storage 110 may store data such as and without limitation program code, sensor data, configuration data, challenge library data, historical data, and the like. Storage 110 can comprise one or more memory components, such as and without limitation read only memory, random access memory, solid-state memory, buffer memory, hard drive memory as well as any other memory now known or later developed.

Controller 104 may be any processing unit, and may control operation of device 102, including without limitation controlling device 102 to execute program code to provide functionality in accordance with one or more embodiments of the present disclosure. Controller 104 may generate control signals for any of the one or more sensor(s) 112, and may receive data signals from any of the one or more sensor(s) 112. Controller 104 may comprise one or more processing units, ASICS, circuits, and the like.

Display 106 may provide graphics, e.g., text, still images, videos, etc. to the user. In accordance with one or more embodiments, display 106 may display a pattern to be traced by the user, an image to be captured by the user, etc. In accordance with one or more embodiments, controller 104 may instruct the display 106 to display the pattern and/or image, instruct the display 106 to display feedback to allow the user to monitor the user's response, e.g., the display 106 might display all or a portion of the user's pattern tracing input and/or the image captured or being sentenced by a camera.

Interface 114 may comprise one or more interfaces, such as and without limitation one or more wireless and/or wired network interfaces. Interface 114 may comprise one or more antennas for wirelessly communicating with a data network and/or with the one or more sensors 112. By way of some non-limiting examples, the one or more antennas may comprise antennas for communication with Bluetooth-enabled devices, a WiFi network, cellular network, radio network, or any combination thereof. In accordance with one or more embodiments, interface 114 may be used to send and receive data with another computing system, e.g., one or more server computing systems. By way of some non-limiting examples, the data that might be sent and/or received by the user's device might comprise sensor data, human verification testing result(s), challenge data, program code, etc.

In accordance with one or more embodiments, the one or more sensors 112 may include at least one motion sensor, coupled to a user's mobile computing device is/are used in a human verification test, e.g., a challenge-response test. In accordance with one or more embodiments, the user might be challenged to trace a pattern in three-dimensional space that matches a pattern shown on a display, e.g., a display of the user's mobile computing device. In accordance with one or more embodiments, the user might be challenged to take a picture of an object in the vicinity of the user's device.

In accordance with one or more embodiments, the one or more sensors 112 may comprise directional, location, altitude, orientation, geo-location, proximity, camera, temporal, etc. sensors. Of course it should be apparent that any other type of sensor now known or later developed may be used with one or more embodiments of the present disclosure.

By way of some non-limiting examples, a directional sensor may provide information identifying a cardinal direction in which the device is moving from a given point, e.g., a point in space, a location sensor may provide information indicating distance, e.g., how far and/or near, of the device from a given point, an altitude sensor may provide information indicating how high/low the device is from a given point, an orientation sensor may provide an X-Y-Z position/orientation of the device at a given point, a geo-location sensor may provide information indicating a latitude and longitude of the device at a given point, a proximity sensor may provide information indicating how near/far the device is from an object or person, a camera may capture an image, and a time sensor may provide temporal information.

By way of some non-limiting examples, the one or more sensors 112 may be internal and/or external to the user's device, the one or more sensor 112 may be coupled to the user's device via a wired and/or wireless connection. By way of some further non-limiting examples, the one or more sensors 112 may comprise a proximity sensor, touch screen, accelerometer, global positioning satellite (GPS) receiver, microphone, moisture, ambient light, magnetometer, gyroscopic, camera, location, etc. sensor. It should be apparent that embodiments of the present disclosure may be used with any sensor now known or later developed.

One or more embodiments of the present disclosure may use all or some of the sensor(s) 112 available to a user's computing device, to respond to a challenge, which challenge may comprise a pattern, which the user is asked to draw out, and/or an image of an object, of which the user is asked to take a photo to prove that the user is human. In discussing one or more embodiments of the present disclosure, the term object may be used to include both inanimate and animate objects, which may include the user or another person, or persons. Advantageously, a challenged posed in accordance with one or more embodiments is less invasive than biometric verification techniques and provides a more entertaining experience than conventional challenge-response techniques that require a user to re-enter characters that the user deciphers from a distorted image or receives in a message from a messaging service.

Figure 2:
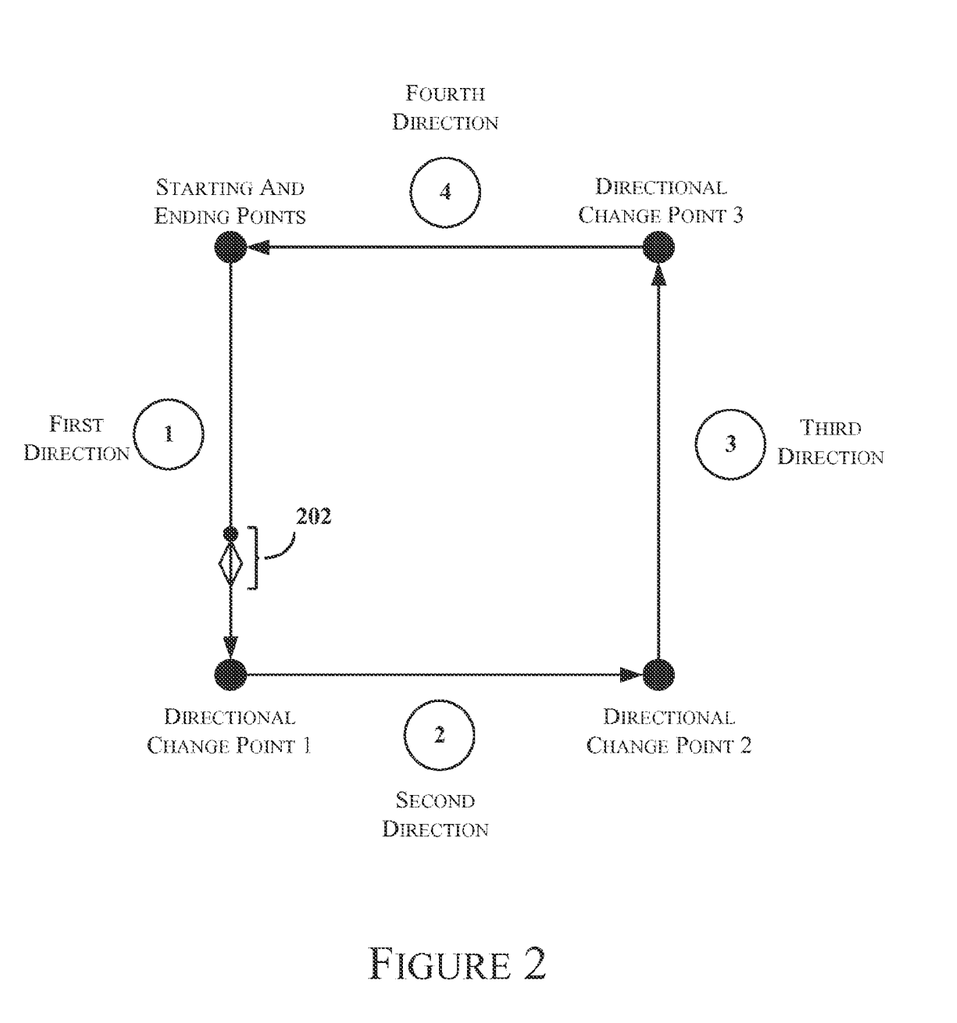
FIG. 2 provides an example of a pattern that might be used in a human verification test in accordance with one or more embodiments of the present disclosure.

FIG. 2 provides an example of a pattern that might be used in a human verification test in accordance with one or more embodiments of the present disclosure. In the example of FIG. 2, the pattern comprises four straight edges, coincident starting and ending points and three directional change points. It should be apparent that the example shown in FIG. 2 is just one example, and that any pattern might be used in accordance with embodiments of the present disclosure.

By way of a non-limiting example, one or more of the straight edges may be replaced with a nonlinear edge comprising a number of curves, which may resemble a squiggly line. By way of another non-limiting example, one or more of the edges might have different lengths, which may make the pattern appear as an irregular polygon. By way of yet another non-limiting example, the pattern might be such that one or more of the angles between two edges might be greater than or less than 90°. It should be apparent, that any combination of linear and nonlinear edges, any combination of angles, etc. may be used to generate a pattern to be posed to the user as part of a challenge-response human verification test in accordance with one or more embodiments of the present disclosure. It should also be apparent that the pattern may comprise anything capable of being traced, which tracing is capable of being monitored using one or more sensors, e.g., the sensor(s) 112, available to the user's computing device.

As yet further illustration and without limitation, a challenge might comprise a maze and the user uses the user's device to trace a path from the start of the maze to the end of the maze. A challenge might comprise a landscape or an artificial object that is to be traced. The challenge might be two-dimensional, three-dimensional, etc. the challenge might comprise a geometric objects, such as and without limitation a star, cube, rectangle, etc. The challenge might involve an outline or other pattern associated with a landmark or other familiar object. By way of a non-limiting example, the challenge might comprise a pattern depicting Mt. Everest, and the user is requested to trace a path from its base and climbing to its summit. The challenge might involve an outline of a flower and the user is requested to trace the flower's outline.

By way of yet another non-limiting example, a challenge might be presented in a form of a game prompting the user to make one or more plays in the game in response. To illustrate, the game might be a race car game that presents a pattern in the form of a race car track, e.g., a randomly-generated track, and the user uses the user's device to trace a path from the race track's starting position to the race track's finish line using the device's one or more sensors to guide the car along the track. Feedback might include advancing an image or icon of a race car along the track in response to the user's movement of the user's device tracing the race track.

Referring again to FIG. 2, the challenge may begin at a point in space coincident with the user's device. The starting point may be a current position of the device or a position to which the user is asked to move the device before beginning to trace the pattern. From the starting point, the user is asked to trace edge 1 in a first direction to the first directional change point, trace edge 2 in the second direction to the second directional change point, trace edge 3 in a third direction to the third directional change point, and trace edge 4 in a fourth direction to the ending point. In the example shown in FIG. 1, the starting and ending points are the same; however, it should be apparent that the starting and ending points need not be the same.

Assume for the sake of example that the pattern shown in FIG. 2 is to be traced in a three-dimensional space, where the user might be asked to move the device left or right in the X, or horizontal, direction, toward or away from her in the Y, or vertical, direction, and/or up or down in the Z, or depth, direction. Each of the first, second, third and fourth directions may be in the X, Y, or Z direction. By way of a non-limiting example, the direction associated with edge 1 may be such that the user is to move the device in space from the starting point toward the user along edge 1 to direction change point 1, at which point the user changes direction of the trace by moving the device to the right to directional change point 2, at which point the user changes direction of the trace by moving the device away from the user to directional change point 3, at which point the user changes direction of the trace by moving the device to the left to the ending point. As yet another alternative, the first direction might be in the Z direction, such that the user traces edge 1 by moving the device from the starting point down, or up, to directional change point 1, then change direction, e.g., in the X or Y direction, to directional change point 2, then the device up, or down, to directional change point 3 then change direction, in the X or Y direction, to arrive at the ending point.

In accordance with one or more embodiments, as the user traces a pattern, feedback may be provided to the user. By way of a non-limiting example, the challenge, e.g., the pattern shown in FIG. 2, may be displayed via the user device's display, e.g., display 106 of device 102, and an icon or other graphical user interface (GUI) widget, might trace the motion of the user's device relative to the displayed challenge. The example shown in FIG. 2, icon 202 provides visible feedback of the trace position of the user's device, e.g. icon 202 shows that the user's device is following edge 1 and is approaching directional change point 1. It should be apparent that various forms of feedback may be used in combination or alone. By way of a non-limiting example, audible feedback may be provided, e.g., a beep, voice, etc., to alert the user that the user is deviating from or following the pattern, that the user is approaching a change point, that the user has reach a change point, etc. Audible feedback might be used in combination with visible feedback, such that icon 202 might be displayed together with visible feedback to alert the user as the user responds to a challenge. As yet another example, tactile feedback may be provided alone or in combination with one or more other forms of feedback, such that the user's device may vibrate as an alert to alert the user as the user responds to a challenge. Other forms of feedback are also possible, including an additional display area, or display areas, as discussed in connection with FIG. 4.

In the example shown in FIG. 2, the challenge comprises a pattern and the user is requested to respond by tracing the pattern. By way of another non-limiting example, the challenge may be an image and the user is asked to respond by replicating the image using a camera to capture the image, which image may then be matched with the challenge image to verify that the responder is a human responder. In accordance with one or more embodiments, the image that is selected as a challenge may be based on a determination of the device's location using the device's location services, e.g., a GPS receiver. By way of a non-limiting example, it might be determined that the device is located near a landmark, position of interest (POI), familiar object, etc., such that a human user of the device can replicate the challenge image using the camera sensor available to the user's device. The challenge may comprise any object, such as a non-human, a human, etc., which is capable of being captured using a camera or other image capturing component or device coupled to the user's device. By way of further non-limiting example, an image of the object of which the user is requested to capture an image may be displayed using the device's display, e.g., display 106 of device 102. The device's display may also be used to provide feedback from the camera, such that the challenge and the potential response may both be displayed simultaneously using the device's display. In so doing, the user can compare the challenge image with the user's response image prior to submitting the user's response. The user may position, orient, focus, etc. the camera before snapping and/or submitting the user's response to the challenge.

In accordance with one or more embodiments, information provided by one or more of the sensors, such as and without limitation geo-location information provided via the device's GPS receiver, may be used to determine a type of challenge that is to be used, e.g., a trace challenge or an image challenge. By way of a non-limiting example, geo-location information provided via the device's GPS receiver might indicate that the device is located near a familiar object, such as the Statue of Liberty. Embodiments of the present disclosure may also use other information, such as and without limitation the challenge(s) previously posed to the user, to determine a challenge type that is to be used. By way of a non-limiting example, in a case that the previous one or more challenges involved tracing a pattern and the geo-location information determined for the device indicates that the device is located near a familiar object, in image-based challenge might be used. Alternatively, in a case that the previous one or more challenges involved an image-based challenge, a trace-based challenge might be used.

Figure 3A:
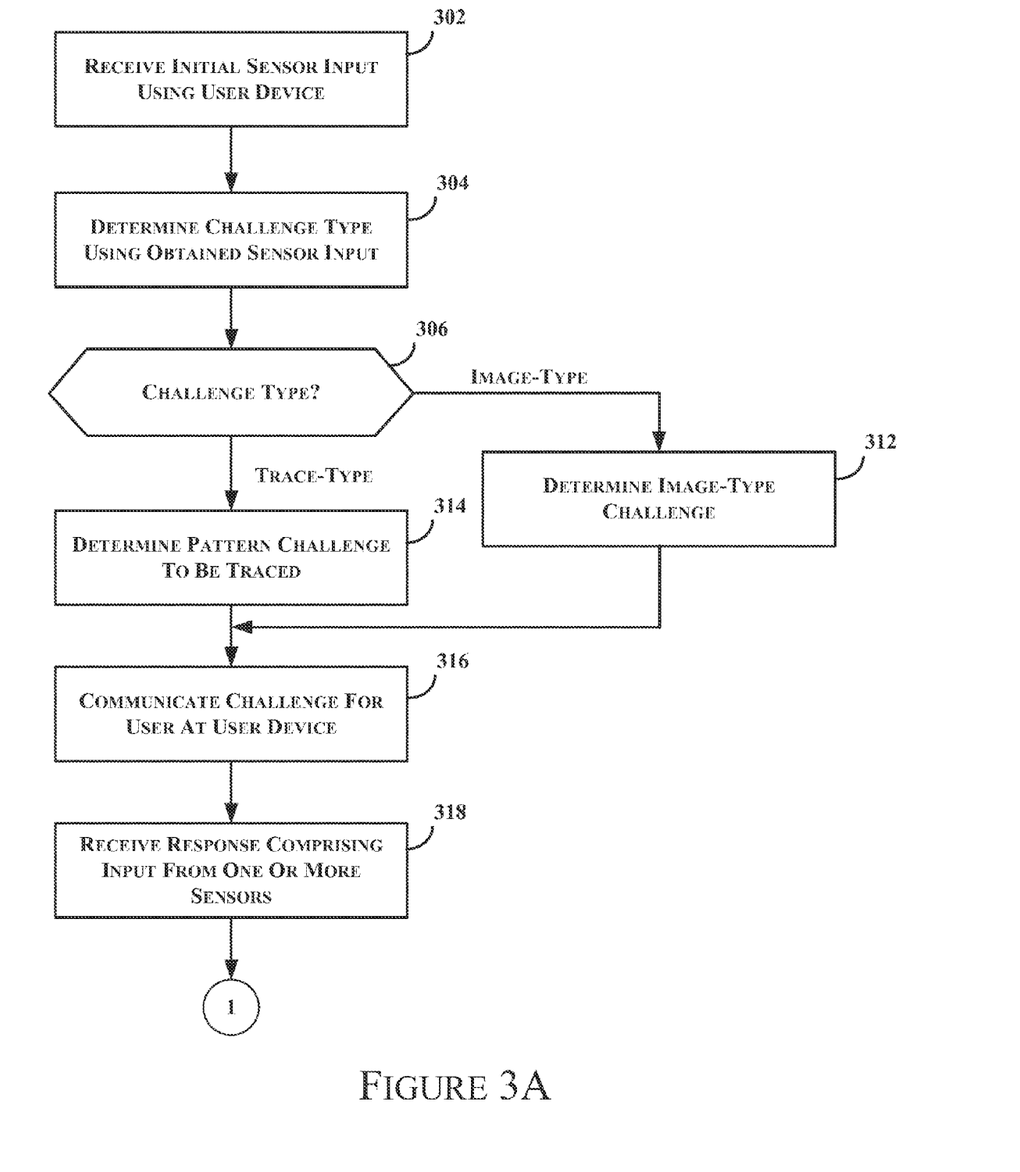
FIGS. 3A and 3B, illustrates a challenge-response process flow in accordance with one or more embodiments of the present disclosure.
Figure 3B:
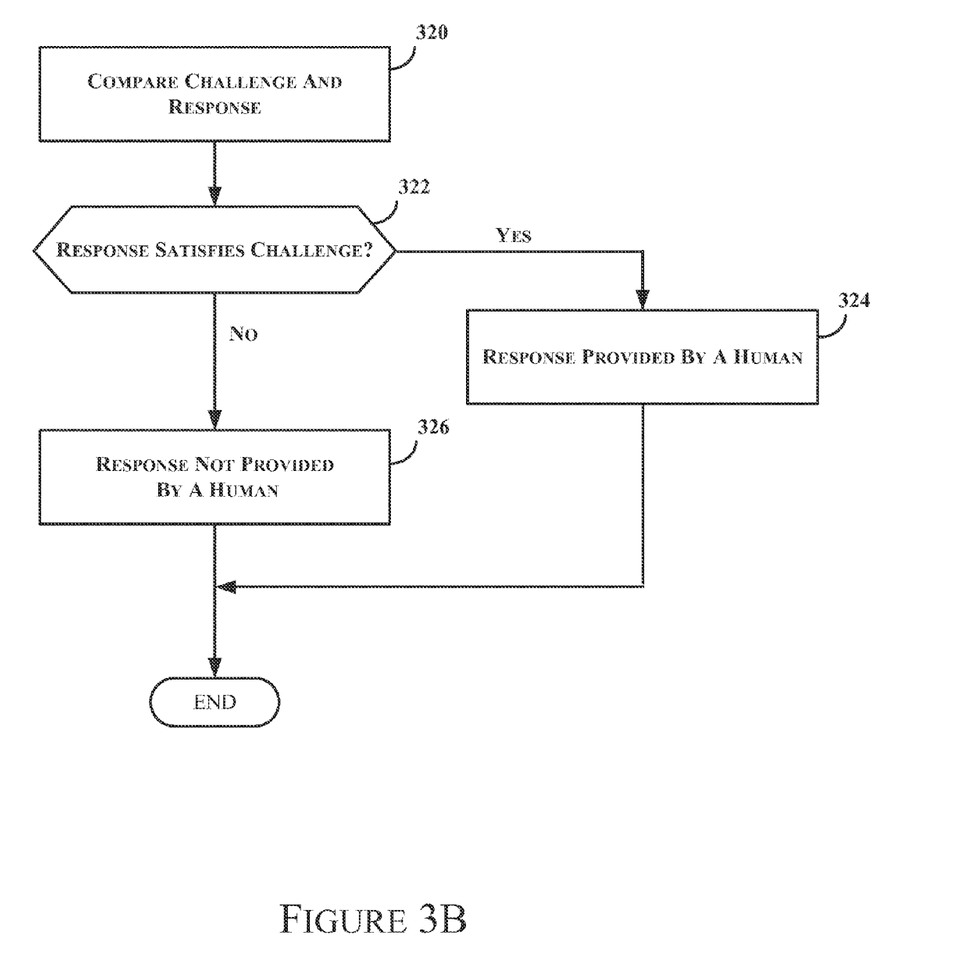

FIG. 3, which comprises FIGS. 3A and 3B, illustrates a challenge-response process flow in accordance with one or more embodiments of the present disclosure. In the example shown in FIG. 3, an initial step 302 obtains initial sensor input using one or more sensors of the user's device. Step 302, which is optional, may be used to capture geo-location information, for example, which may be used to determine a type of challenge to be used to verify that the responder is a human being. As discussed above, geo-location sensor information may be used to determine whether or not the device is near a familiar object that may be captured in an image-based challenge using a camera, e.g., an internal camera or a camera coupled to the user's device.

At step 304, a type of challenge is determined, and such determination may be based on the sensor input received, or obtained, at step 302. It should be apparent that the determination made at step 304 may be based on information other than sensor input obtained at step 302. In accordance with one or more embodiments, historical information may be maintained regarding some number of the last challenges posed to the user, and the historical information may be used to determine the next challenge to pose to the user. By way of a non-limiting example, in a case that the last one or more challenges involved trace-based challenges, the determination may be made, at step 304, to use an image-based challenge, in a case that a familiar object is known to be in the vicinity of the device's current location.

At decision step 306, processing continues at step 312, where the determination is made, at step 304, to use an image-based challenge. Embodiments of the present disclosure may maintain a library of images, each of which may be associated with a geo-location. At step 312, the device's geo-location may be used to retrieve an image from the library of images to be used in a challenge. Processing continues at step 316.

If it is determined, at step 304, to use a trace-based challenge, processing flows from decision step 306 to step 314, where a pattern challenge is determined. In accordance with one or more embodiments, the pattern may be any pattern capable of being re-created, or traced, using the user's device, e.g., using movements of the user's device. By way of some non-limiting examples, the pattern may be a linear pattern, such as the example shown in FIG. 2, the pattern may be a non-linear pattern, etc. By way of a further non-limiting example, a determination between a linear and a non-linear pattern may be made based on historical information, such as information that identifies patterns used in previous challenges. After a pattern is selected for the challenge, at step 314, processing continues at step 316.

At step 316, the challenge is made available for purposes of posing it the user, e.g., by displaying it on a display of the user's device. By way of a non-limiting example, a challenge may be communicated via at least one server computer to the user's device. By way of another non-limiting example, the challenge may be determined by a challenge-response component executing on the user's device, which component may communicate the challenge for display using the device's display. By way of yet another non-limiting example, the challenge may be made available using a server computer and the user's device; such that, a server computer identifies, or selects, the challenge, forwards information identifying the selected challenge and the user's device uses the forwarded information to retrieve the challenge, e.g., the pattern or the image, from the device's storage.

Figure 4:
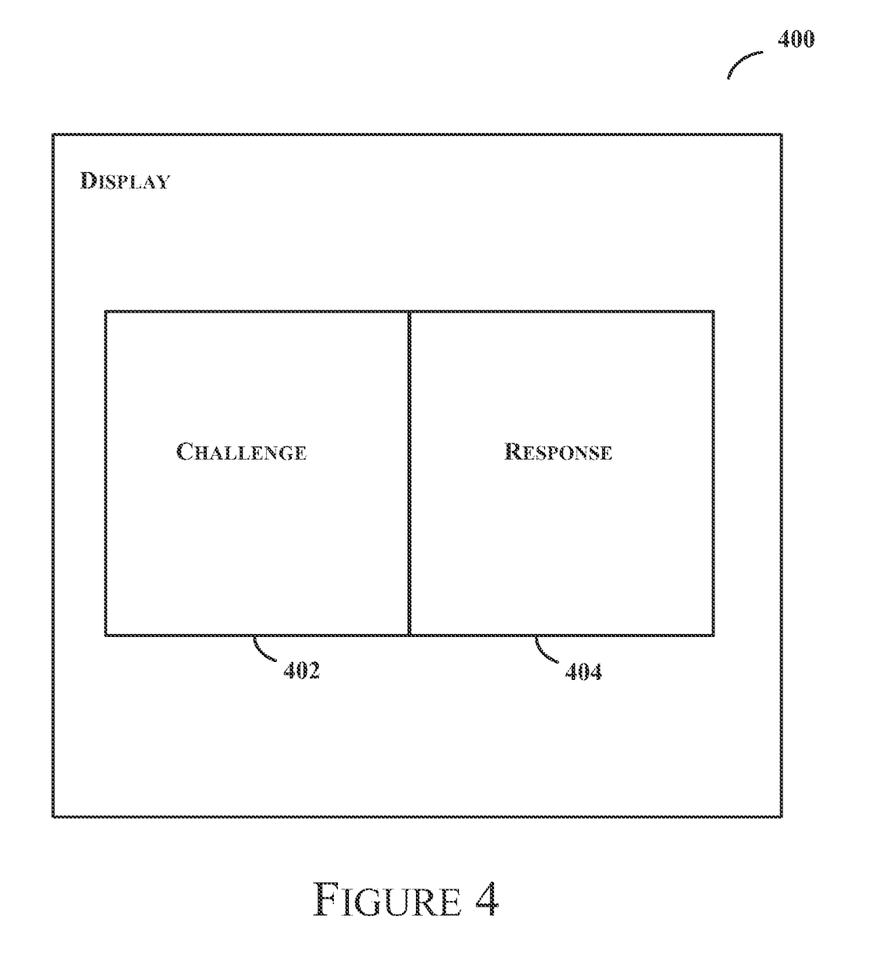
FIG. 4 provides an example of a display for use in a challenge response in accordance with one or more embodiments of the present disclosure.

FIG. 4 provides an example of a display for use in a challenge response in accordance with one or more embodiments of the present disclosure. In the example of FIG. 4, display 400, which may be display 106 of device 102, comprises a challenge display area 402 and a response display area 404. The challenge display area 402 may be used to display a trace-based challenge or an image-based challenge. The response display area 404 may be used to display the user's response, e.g., the pattern tracing done by the user using one or more of the sensor(s) 112, the image captured by the user using a camera, etc. By way of a further non-limiting example, the pattern example shown in FIG. 2 might be shown in display area 402, the portion of the pattern traced by the user might be shown in display area 404, and icon 202 might be shown in display area 402 and/or display area 404. Although not shown, display 400 may include one or more buttons, which may be used to submit a response, redo a response, etc.

Referring again to FIG. 3A, at step 318, a response generated using one or more of the device's sensors is received. By way of a non-limiting example, the response might be considered complete when a trace pattern is fully traced, an image is captured and/or a submit button is pressed. Referring to FIG. 3B, the challenge and response are compared to determine a degree of similarity between the challenge posed to the user and the response provided by the user. In accordance with one or more embodiments, the degree of similarity may vary, such that in one verification test, the response may need to be highly similar to the challenge and in another verification, the response may need to be moderately similar to the challenge, etc. The level, or degree, of similarity may be expressed as a threshold degree of similarity, and may be predetermined threshold. There may be multiple predetermined thresholds, with one of the predetermined thresholds being selected for a given human verification test.

At step 322, a determination is made whether the response is sufficiently similar to the challenge such that the responder may be identified as a human responder. By way of a non-limiting example, where the similarity between the challenge and response meets or exceeds a predetermined threshold level of similarity, a determination is made that the response satisfies the challenge and the responder is identified as a human responder at step 324. Conversely, where the similarity between the challenge and response fails to meet the predetermined threshold level of similarity, a determination is made that the response does not satisfy the challenge and the responder is identified as other than a human responder at step 326. By way of a non-limiting example, an outcome of a challenge-response human verification test identified at step 324 or step 326 may be provided to an application executing on the user's device, to application executing on a server computer, or both.

In accordance with one or more embodiments, one or more server computers may comprise one or more human verification testing components. By way of a non-limiting example, the one or more servers may perform some or all of the process steps shown in FIG. 3. By way of another non-limiting example, the one or more servers may communicate program code for execution at the user's device to perform the process shown in FIG. 3. In such a case, the user's device might communicate the outcome of the human verification tests determined that step 324 or 326 to a server computer and/or an application running on the user's device, for example. By way of yet another non-limiting example, the one or more servers may provide a library of challenges to the user's device, which library might comprise images and/or trace patterns; and/or the one or more servers may provide program code to the user's device for generating challenge patterns and/or identifying challenge images to the user's device.

Figure 5:
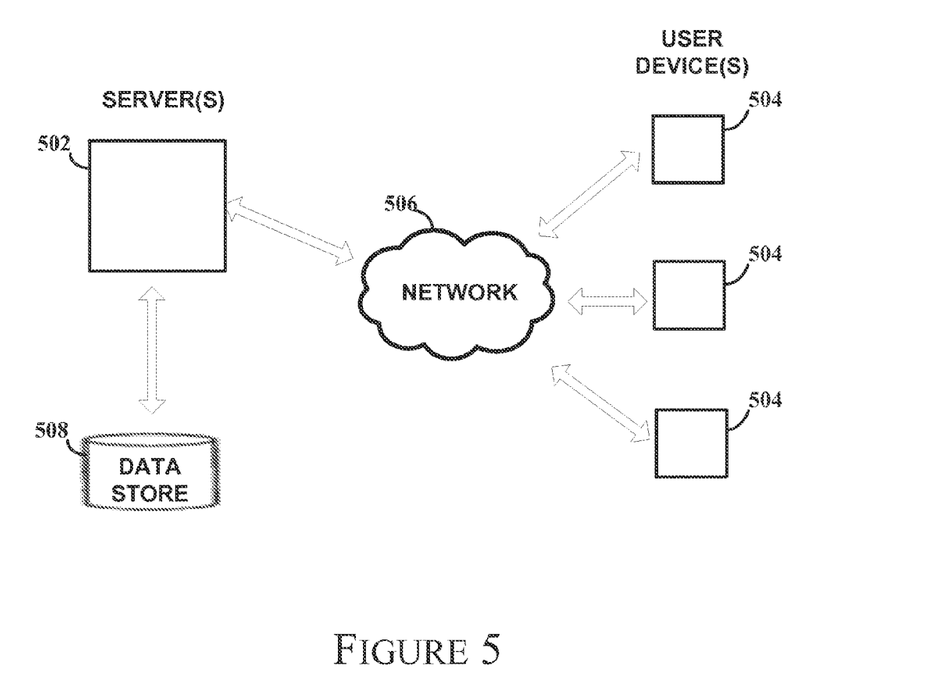
FIG. 5 illustrates some components that can be used in connection with one or more embodiments of the present disclosure.

FIG. 5 illustrates some system components that may be used in connection with one or more embodiments of the present disclosure. In accordance with one or more embodiments of the present disclosure, one or more computing devices, e.g., one or more servers, user devices, etc., are configured to execute and/or use functionality described herein. For example, a computing device 502 may be configured to execute program code, instructions, etc. to provide functionality in accordance with one or more embodiments of the present disclosure. The same or another computing device 502 can be configured to communicate program code, instructions, etc. to the user device(s) 504, such that the user device(s) 504 performs some or all of the process of FIG. 3. The same or another computing device 502 can be associated with one or more resource data store 508. Resource data store 508 may comprise program code, instructions, etc. for execution by the computing device 502 and/or the user or device(s) 504. Resource data store 508 may comprise a library of challenges, which may be used by the computing device 502 and/or communicated to the user device(s) 504.

Computing device 502 may serve content to user computing devices 504 using a browser application via a network 506.

The user computing device 504 may be any computing device, including without limitation a personal computer, personal digital assistant (PDA), wireless device, cell phone, smartphone, tablet, etc. For the purposes of this disclosure a computing device includes a processor and memory for storing and executing program code, data and software, and may be provided with an operating system that allows the execution of software applications in order to manipulate data. In accordance with one or more embodiments, user computing device 504 may be user device 102. A computing device such as server 502 and the user computing device 504 can include one or more processors, memory, a removable media reader, network interface, display and interface, and one or more input devices, e.g., touch pad, keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
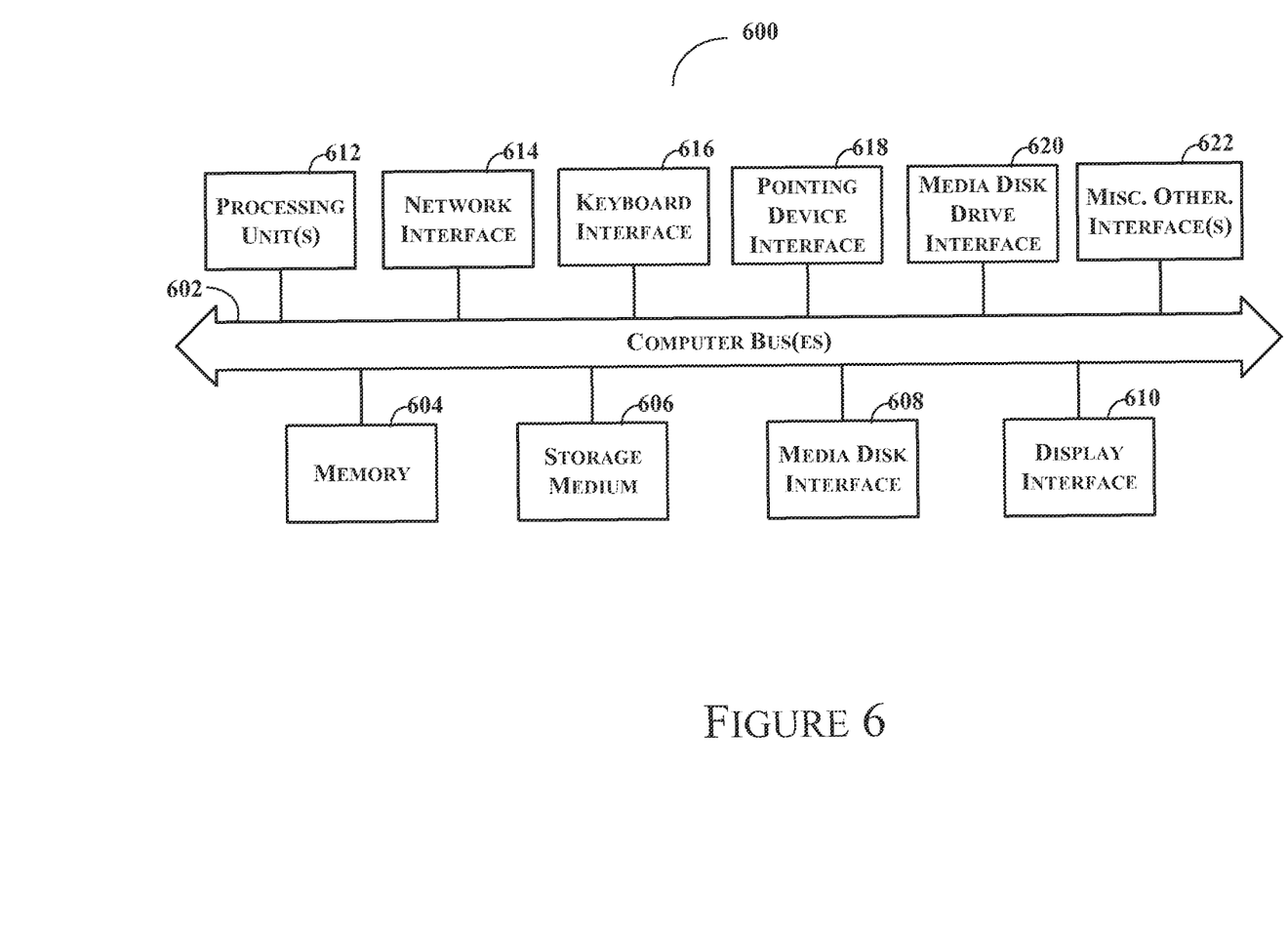
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:
1. A method comprising:
  determining a geo-location of a device using a geo-location sensor;
  selecting, by at least one computing system based on the geo-location of the device, a challenge type for a human verification test to determine whether a responder is human, the challenge type being selected from challenge types comprising a pattern-based challenge comprising a pattern to be displayed as a prompt for a trace of the pattern in response and an image-based challenge comprising an object's image to be displayed as a prompt for an image capture of the object in response;
  determining, by the at least one computing system, a challenge in accordance with the selected challenge type;
  communicating, by the at least one computing system, the determined challenge to be displayed at a user device, the user device comprising one or more sensors;
  receiving, by the at least one computing device, input in response to the communicated challenge, the input comprising a challenge response received using the one or more sensors; and
  determining, by the at least one computing device, whether the challenge is satisfied using the received input, the determining whether the challenge is satisfied comprising comparing the communicated challenge and the received challenge response to determine whether the communicated challenge and received challenge response match to determine whether the responder is human.

2. The method of claim 1, the at least one computing system comprises the user device, and the user device comprises a handheld device.

3. The method of claim 1, the at least one computing system comprises at least one server computer, and the user device is a handheld device.

4. The method of claim 1, the received input comprising input received from one or more sensors monitoring movement of the user device in response to the pattern-based challenge type and the received input comprising input from one or more sensors capturing an image for the image-based challenge type.

5. The method of claim 4, the method further comprising:
causing, by the at least one computing system, response feedback comprising at least a portion of a traced pattern to be displayed based on the received input where the selected challenge type is a pattern-based challenge type.

6. The method of claim 4, the method further comprising:
causing, by the at least one computing system, response feedback comprising an image to be displayed based on the received input where the selected challenge type is an image-based challenge type.

7. The method of claim 1, the determining whether the challenge is satisfied using the received input further comprising:
comparing, by the at least one computing device, the communicated challenge and the received challenge response to determine a degree of similarity between the communicated challenge and the received challenge response;
determining, by the at least one computing device, that the responder is human if the degree of similarity satisfies a predetermined threshold degree of similarity; and
determining, by the at least one computing device, that the responder is other than human if the degree of similarity does not satisfy a predetermined threshold degree of similarity.

8. The method of claim 1, the selected challenge comprises a pattern presented as a game and the input received comprises plays in the game.

9. The method of claim 8, the game is a race car game comprising a randomly-generated race track having start and finish lines, the challenge is satisfied where the received input indicates that the race car is moved from the start line of the race track to the finish line tracing the pattern.

10. A system comprising:
at least one computing device, each computing device comprising one or more processors and a storage medium for tangibly storing thereon program logic for execution by the processor, the stored program logic comprising:
determining logic executed by the one or more processors for determining a geo-location of a device using a geo-location sensor;
selecting logic executed by the one or more processors for selecting, based on the geo-location of the device, a challenge type for a human verification test to determine whether a responder is human, the challenge type being selected from challenge types comprising a pattern-based challenge comprising a pattern to be displayed as a prompt for a trace of the pattern in response and an image-based challenge comprising an object's image to be displayed as a prompt for an image capture of the object in response;
determining logic executed by the one or more processors for determining a challenge in accordance with the selected challenge type;
communicating logic executed by the one or more processors for communicating the challenge to be displayed at a user device, the user device comprising one or more sensors;
receiving logic executed by the one or more processors for receiving input in response to the communicated challenge, the input comprising a challenge response received using the one or more sensors; and
determining logic executed by the one or more processors for determining whether the challenge is satisfied using the received input, the determining whether the challenge is satisfied comprising comparing the communicated challenge and the received challenge response to determine whether the communicated and received challenges match to determine whether the responder is human.

11. The system of claim 10, the at least one computing system comprises the user device, and the user device comprises a handheld device.

12. The system of claim 10, the at least one computing system comprises at least one server computer, and the user device is a handheld device.

13. The system of claim 10, the received input comprising input received from one or more sensors monitoring movement of the user device in response to the pattern-based challenge type and the received input comprising input from one or more sensors capturing an image for the image-based challenge type.

14. The system of claim 13, the stored program logic further comprising:
causing logic executed by the one or more processors for causing response feedback comprising at least a portion of a traced pattern to be displayed based on the received input where the selected challenge type is a pattern-based challenge type.

15. The system of claim 13, the stored program logic further comprising:
causing logic executed by the one or more processors for causing response feedback comprising an image to be displayed based on the received input where the selected challenge type is an image-based challenge type.

16. The system of claim 10, the program logic executed by the one or more processors for determining whether the challenge is satisfied using the received input further comprising:
comparing logic executed by the one or more processors for comparing the communicated challenge and the received challenge response to determine a degree of similarity between the communicated challenge and the received challenge response;
determining logic executed by the one or more processors for determining that the responder is human if the degree of similarity satisfies a predetermined threshold degree of similarity; and
determining logic executed by the one or more processors for determining that the responder is other than human if the degree of similarity does not satisfy a predetermined threshold degree of similarity.

17. The system of claim 10, the selected challenge comprises a pattern presented as a game and the input received comprises plays in the game.

18. The system of claim 17, the game is a race car game comprising a randomly-generated race track having start and finish lines, the challenge is satisfied where the received input indicates that the race car is moved from the start line of the race track to the finish line tracing the pattern.

19. A computer readable non-transitory storage medium for tangibly storing thereon computer readable instructions that when executed cause at least one processor to:
- determine a geo-location of a device using a geo-location sensor;
- select, based on the geo-location of the device, a challenge type for a human verification test to determine whether a responder is human, the challenge type being selected from challenge types comprising a pattern-based challenge comprising a pattern to be displayed as a prompt for a trace of the pattern in response and an image-based challenge comprising an object's image to be displayed as a prompt for an image capture of the object in response;
- determine a challenge in accordance with the selected challenge type;
- communicate the challenge to be displayed at a user device, the user device comprising one or more sensors;
- receive input in response to the communicated challenge, the input comprising a challenge response received using the one or more sensors; and
- determine whether the challenge is satisfied using the received input, the determining whether the challenge is satisfied comprising comparing the communicated challenge and the received challenge response to determine whether the sent and received challenges match to determine whether the responder is human.

20. The computer readable non-transitory storage medium of claim 19, the at least one computing system comprises the user device, and the user device comprises a handheld device.

21. The computer readable non-transitory storage medium of claim 19, the at least one computing system comprises at least one server computer, and the user device is a handheld device.

22. The computer readable non-transitory storage medium of claim 19, the received input comprising input received from one or more sensors monitoring movement of the user device in response to the pattern-based challenge type and the received input comprising input from one or more sensors capturing an image for the image-based challenge type.

23. The computer readable non-transitory storage medium of claim 22, the instructions further comprising instructions to:
- cause response feedback comprising at least a portion of a traced pattern to be displayed based on the received input where the selected challenge type is a pattern-based challenge type.

24. The computer readable non-transitory storage medium of claim 22, the instructions further comprising instructions to:
- cause response feedback comprising an image to be displayed based on the received input where the selected challenge type is an image-based challenge type.

25. The computer readable non-transitory storage medium of claim 19, the instructions to determine whether the challenge is satisfied using the received input further comprising instructions to:
- compare the communicated challenge and the received challenge response to determine a degree of similarity between the communicated challenge and the received challenge response;
- determine that the responder is human if the degree of similarity satisfies a predetermined threshold degree of similarity; and
- determine that the responder is other than human if the degree of similarity does not satisfy a predetermined threshold degree of similarity.

26. The medium of claim 19, the selected challenge comprises a pattern presented as a game and the input received comprises plays in the game.

27. The medium of claim 26, the game is a race car game comprising a randomly-generated race track having start and finish lines, the challenge is satisfied where the received input indicates that the race car is moved from the start line of the race track to the finish line tracing the pattern.

\* \* \* \* \*